July 21, 1970 — L. WINTERSBERGER — 3,521,394

FISHING LURE

Filed June 6, 1967 — 3 Sheets-Sheet 1

INVENTOR.
LUTZ WINTERSBERGER

*INVENTOR.*
LUTZ WINTERSBERGER

July 21, 1970   L. WINTERSBERGER   3,521,394
FISHING LURE
Filed June 6, 1967   3 Sheets-Sheet 3

*INVENTOR.*
LUTZ WINTERSBERGER

United States Patent Office 3,521,394
Patented July 21, 1970

3,521,394
FISHING LURE
Lutz Wintersberger, Munchner Strasse 39/41,
Deisenhofen, near Munich, Germany
Filed June 6, 1967, Ser. No. 643,923
Claims priority, application Germany, June 15, 1966,
W 37,544, W 37,545, W 37,546; July 13, 1966,
W 41,999; Aug. 12, 1966, W 42,203; Nov. 7,
1966, W 42,747; Feb. 11, 1967, W 43,343
Int. Cl. A01k 85/00
U.S. Cl. 43—42.06                                          5 Claims

ABSTRACT OF THE DISCLOSURE

A fishing lure has the shape of a hollow conical funnel of substantially the same wall thickness with a substantially large front and narrow rear. The line is attached to a connection inside the lure along the central axis and adjacent the center of gravity of the lure body. Fishing hooks can be also attached to a connection located upon this central axis. Blades similar to those of a turbine are located inside the lure close to its inlet. The lure can be made to produce sounds and to carry out various motions in calm or still waters for example.

---

This invention relates to a fishing lure and refers more particularly to an artificial fish catching English lure.

Artificial lure bodies known in prior art are so constructed that they endeavor to excite a fish by optical, acoustical or other means and to induce it to bite. These lures have a spoon-shaped body producing a peculiar flow around it which, however, does not greatly mislead predatory fish. On the other hand, the spinner has rotating spoons of the propeller type which may have the effect of preventing a fish from biting due to the large deflection radius. Prior art also includes wobblers which have a head scoop serving as a deep rudder which when wound or pulled, imparts to the wobbler a dancing or swinging movement.

An object of the present invention is to provide a fish catching lure of a novel type which is particularly suitable for so-called exhausted waters wherein the fish has become so used to existing lures that it is not attracted any more by them.

Another object is the provision of a fish lure which can be pulled through the water in a stabilized condition at any desired slow speed, which does not provide large deflections for the lure body or the hook and which when pulled through the water can produce a sound which will excite the fish.

A further object is the provision of a fish lure which can be easily thrown into the water and which can be conveniently guided while being pulled out.

Other objects of the present invention will become apparent in the course of the following specification.

According to one embodiment, the present invention pertains to the fish lure having a catch hook and a body open at mouth and tail, the rear of the body having the shape of a conically tapering funnel or a hollow cone.

Another feature of the present invention pertains to a lure body the front inlet surface of which is substantially larger than the rear outlet surface.

According to another feature, the invention pertains to a funnel-shaped or trumpet-shaped lure body wherein the parts for attaching the pulling line and the rod of the catch hook all lie in the central axis within the lure body.

It is apparent that these means attain the above-stated objects. It should be also noted that when the funnel-like or trumpet-like lure is thrown, it flies as the head of an arrow in the direction in which it was thrown due to air resistance upon the outer surfaces of the funnel. Since the body of the lure is similar to a flow pipe, it is ready to catch fish as soon as it strikes the water. (It is a matter of general knowledge that a large number of predatory fish bite as soon as a lure has hit the water.)

When the lure is pulled, a water jet is produced by dynamic pressure which rises with high speed and it results in a turbulent flow combined with a noise; this was found to be fascinating for the predatory fish.

The novel shape of the lure of the present invention makes it possible to vary the attachments to the lure body; this can be attained by a single screw connection, for example, a screw for a head spindle. Thus weights can be provided, or specially colored sample sockets, or another set of hooks, etc. Furthermore, the shape of the lure makes it possible to protect the hook by the larger head portion, particularly when it has the shape of a trumpet.

If desired, the same lure body can be used in a slightly adjusted form in an entirely novel manner as a carrier for dead fish, whereby the greatly tapered or straight part of the flow pipe constituting the lure is thrust by its rear portion through the fish and the dead fish is held thereon by pins or the like which serve as cutters and which extend through the lure and the fish body while carrying rings for the hooks. However, the attachment can be also provided, for example, by the lure and a head spindle bolt.

It is also possible to freely mount a trap shaped as a double rudder inside the lure body so that it will carry out zigzag movements during the flow.

Twisted flow elements similar to turbine blades and attached to the flow pipe constituting the lure at the inside and/or at the outside, can impart a rotary movement to the trumpet-like flow pipe as it is pulled through the water; such movement will mislead a fish and will attract it; sounds accompanying the movement will attract the fish and cause it to bite.

When the elements similar to turbine blades are located inside the lure closely behind the inflow opening, the hub of these elements can be shaped as rearwardly enlarging hollow cone trunk and, if desired, can be provided with a swivel fitting in the hub upon which are suspended the hook branches and the hook rod. This arrangement has the advantage that when a fish is freed from the hook the lure can be pulled forwardly in a simple manner.

The invention will appear more clearly from the following detailed description when taken in connection with the accompanying drawings, showing by way of example, preferred embodiments of the inventive idea.

In the drawings:

Similar parts are designated by the same numerals throughout the drawings.

FIG. 1 illustrates diagrammatically the manner in which dynamic pressure is built up in a lure constructed as a pipe tapering in the direction of flow with resistance in water and turbulency at the outlet due to higher outflow speed of a central stream stabilizing the pipe and at the same time guiding it, which is released by the transitionless outflow at the end of the pipe.

Figure 1:
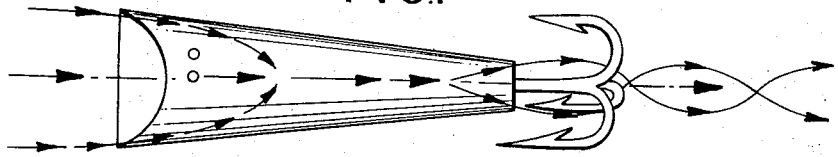
FIG. 1 is a diagram illustrating the basic principles of the present invention.
Figure 2:
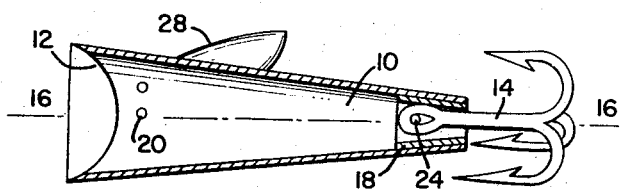
FIG. 2 is a section through a fishing lure constructed in accordance with the present invention.
Figure 3:
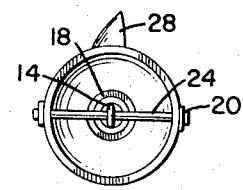
FIG. 3 is a front view showing the head of the lure of FIG. 2.

An embodiment of the fishing lure of the present invention is illustrated in FIGS. 2 and 3. The lure 10 consists of a conical or funnel-shaped flow pipe which is hollow throughout, so that water entering at the head when the rope is pulled will flow under pressure in the form of a spray through a comparatively very small outlet surface. The lure 10 has an inlet 12 and an outlet 14 and is completely symmetrical with respect to its central axis 16—16. Guide fins 28 are used to produce additional turbulency. The lure body can be made of metal, rubber or plastics; its attachments depend upon practical requirements and the material of which the lure is made. A sleeve 18 is fitted into the outlet opening 14; it reduces the outlet area and serves as a weight. The hooks are attached to the lure body by a pin 24 located adjacent the outlet 14.

The line is attached centrally to a spindle bolt 20 extending diametrically through the lure body at the inlet thereof.

The line can be also attached to the bolt by a loop or other suitable connection carried by the bolt.

Figure 4:
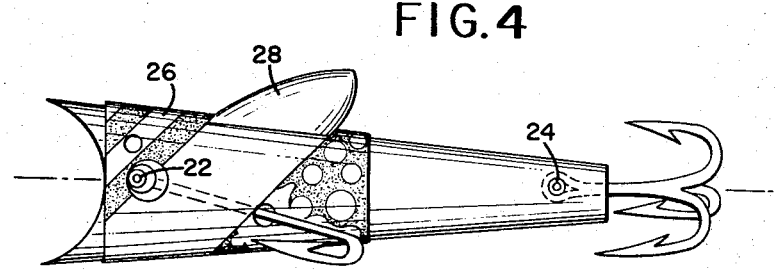
FIG. 4 is a side view of another fishing lure constructed in accordance with the present invention.

FIG. 4 shows a lure body wherein a spindle bolt 22 is also used for attaching the stem of the front hook and for fixing sockets 26 for samples and weights. The spindle bolt 22 extends through the lure body and has portions located outside of the lure body and carrying sockets 26 which are fixed thereto, as well as the eyelet for a front hook. The bolts 22 and 24 are fixed to the lure body by any suitable means not shown in the drawing. In this construction the rear hook must be attached separately by the bolt 24.

Figure 5:
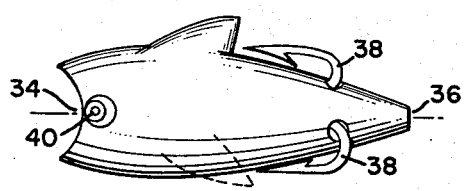
FIG. 5 is a side view of a third embodiment of the present invention.
Figure 6:
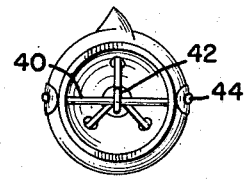
FIG. 6 is a front view showing the head of the lure of FIG. 5.

FIGS. 5 and 6 show a lure suitable for sport fishermen who have become used to a lure simulating a fish. In this construction the inlet 34 the area of which extends perpendicularly to the central axis, is also substantially larger than the outlet 36. Hooks 38 lie close to the fish body behind a comparatively large head. It is apparent that they are effectively protected against being hung or stuck. As shown in FIG. 6, the rods 42 of the hooks are centrally fixed upon a spindle bolt 40. If desired, the line can be also attached to the same bolt. The bolt 40 can be secured by removable screws 44 located outside the lure body. Obviously other means can be used for fixing the bolt 40.

In this construction the curved funnel-shaped form of the lure body is utilized to produce strengthened vibrating noises.

It should be noted that in all constructions of the fishing lure of the present invention the hooks can be located completely within the outlines of the lure body behind the fins, so as to be protected by them, provided the lure body is made of rubber or the like.

Figure 7:
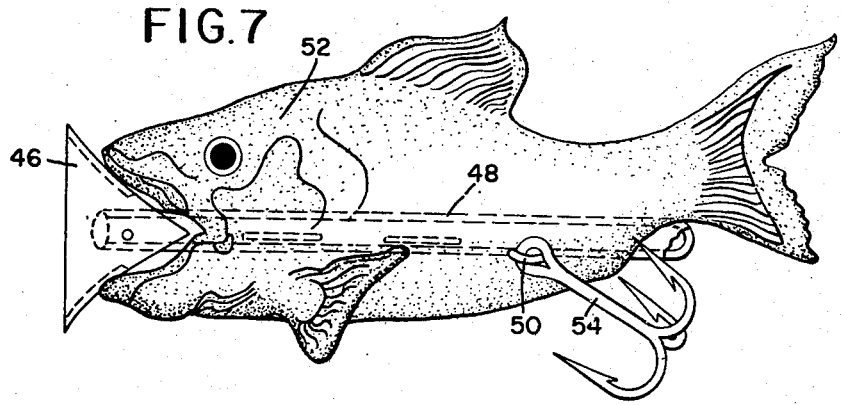
FIG. 7 is a side view of a fourth embodiment particularly suitable for holding a fish bait.

FIG. 7 shows a different lure construction having a trumpet-like front part 46 integral with a body 48 of smaller diameter shaped as a test tube.

The body 48 carries eyelets 50 which are firmly connected therewith. The thin body 48 with the eyelets 50 is pressed into a dead fish 52 from the front. The body 48 is constructed with the eyelets 50 extending outwardly therefrom. However, the size of the eyelets 50 is sufficiently small so that they will fit inside the dead fish along with the body 48. Then the eyelets 50 must be pressed through the body of the dead fish so that they will appear outside of fish body. This can be done by hand or by any suitable instruments. Then the triple hooks 54 are suspended therefrom. The fish body is then strengthened by the insert, it is held centrally, it is damaged to the least possible extent and when the lure parts 46, 48 are fully effective, it simulates in its movements its live counterpart.

In case of larger fish, the eyelets sometimes cannot be pressed out conveniently and then rigid long eyelets must be used which are inserted from the outside into the fish body, passed through slits formed in the hollow tubular portion 48 and then secured on the other side.

Figure 8:
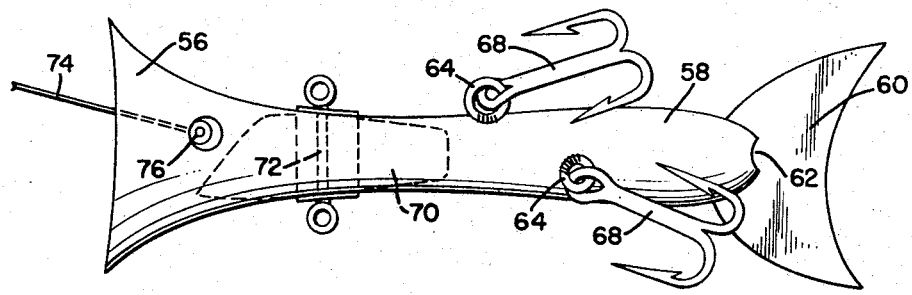
FIG. 8 is a side view of yet another embodiment having a different construction of the rear lure body and provided with means for producing sounds.

The embodiment of the invention shown in FIG. 8 has a trumpet-like front section 56 integral with a narrowing hose-like soft part 58 terminating in tail fins 60. An outlet 62 is located adjacent the tail fins. The fluttering part 58 is stabilized only when it is in a stream or when it is pulled through stationary waters; thus it simulates in a most effective manner the movements of the tail of a fish, such as a trout resting in a stream. Annular eyelets 64 for the hooks 68 are fixed to the part 58. The interior of the lure body constituted by the parts 56, 58 forms a flow channel containing a flap 70 shaped as a double rudder. The flap 70 is located directly behind the front section 56 and is swingably mounted upon an axle 72 fixed at both ends. A line 74 is attached to a spindle bolt 76. When the line is pulled the flap 70 will cause the lure to carry out zigzag movements in water.

Figure 9:
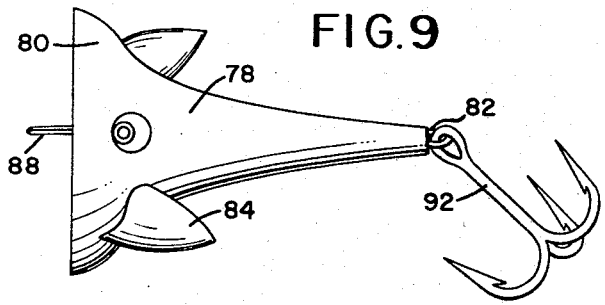
FIG. 9 is a side view of a sixth embodiment particularly suitable for calm waters.
Figure 10:
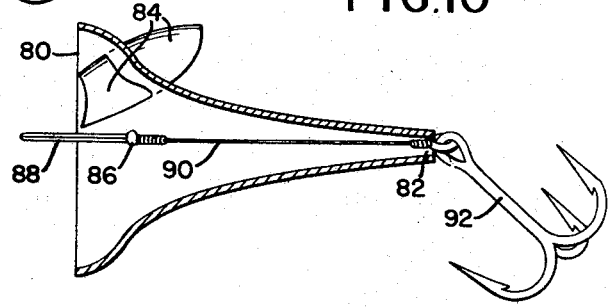
FIG. 10 is a longitudinal section through the lure shown in FIG. 9.

FIGS. 9 and 10 show a fishing lure having a body 78 and particularly suitable for use in still waters. The area of the inlet of the trumpet-like front part 80 is larger than the area of the outlet opening 82 in a proportion of at least 30:1. Propeller-like flaps 84 can be fixed by screws. A spindle bolt 86, located adjacent the center of gravity of the body, carries a line 88 and a hook connection 90 from which the hook rod 92 is suspended. In this construction the hooks are effectively protected against being hung upon weeds by the large inlet area of the front part 80.

Constructions shown in FIGS. 11 to 17 all have lure bodies shaped as uniformly rearwardly diminishing trumpet-like or cone-like tubes 101.

FIGS. 11, 13, 16 and 17 show lures with tail-like symmetrical flaps 102.

Figure 11:
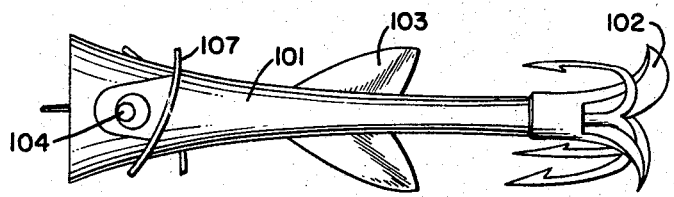
FIG. 11 is a side view of yet another embodiment suitable for producing special effects to be explained hereinafter.
Figure 12:
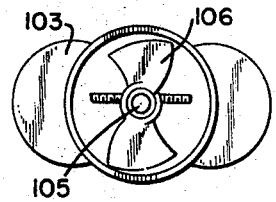
FIG. 12 is a front view of the lure shown in FIG. 11.

In the construction shown in FIGS. 11 and 12 additional flaps 103 are attached to the cone-shaped tubular body 101. It is advantageous to hang the hook rod upon the spindle bolt 104. A massive fixing hub 105 extends centrally axially within the lure body 101. It is mounted in the body by any suitable means (not shown). Flow elements 106 similar to turbine blades are rigidly centrally fixed shortly behind the inflow opening to the hub-like member 105 and are also rigidly fixed by their ends to the inner surfaces of the body 101. The turbine-like blades 106 are so twisted that when the lure body is pulled axially through the water, the lure body will carry out a rotary movement while producing noises at the same time. This effect is also produced and furthered by twisted blades 107 provided upon the exterior of the lure body.

Figure 13:
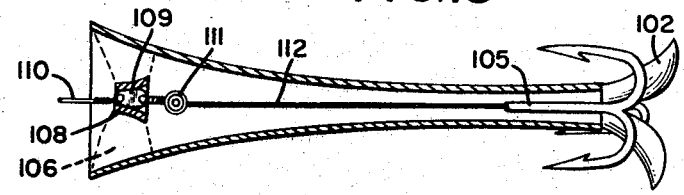
FIG. 13 shows in section a different embodiment of the lure of the present invention.

FIG. 13 shows a construction wherein the hub supporting the blade-like elements has the shape of a rearwardly enlarging hollow cone 108. The blade-like elements of FIG. 13 have the same shape as the elements 106 shown in FIGS. 11 and 12. A conical link 109 is fixed at the rear of and within the link 108. An eyelet 110 to which the fisherman can attach his line, etc., is connected to the link 109. Upon the rear side of the link 109 a swivel 111 is mounted which is known per se and from which the hook connection 112 with the hook 105 is suspended. When a fish is freed from the hook 105 the tubular lure body is simply pulled forwardly.

Figure 14:
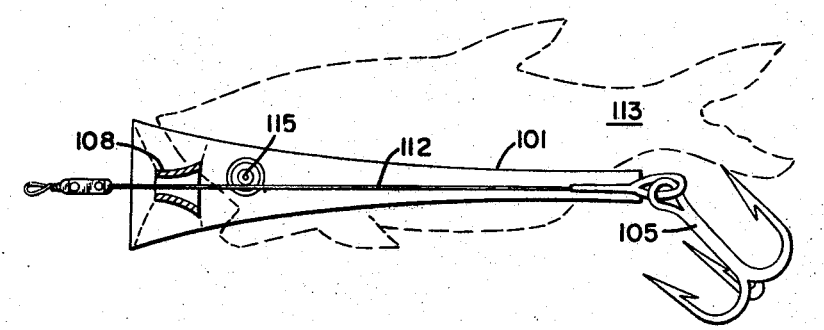
FIG. 14 shows partly in section a lure which is somewhat similar to that shown in FIG. 13 but which is intended for a different use.
Figure 15:
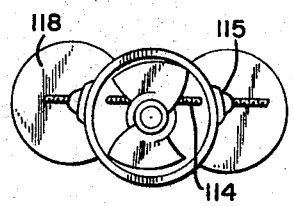
FIG. 15 is a front view of the lure shown in FIG. 14.

FIGS. 14 and 15 show a further application of a lure tube of this type as a holder for dead fish 113 as bait. The hollow cone 108 is the same as shown in FIG. 13. However, in the construction of FIG. 14 the conical bolt is eliminated and is replaced by the usual double swivel. This has the advantage that the fisherman can impart to the fish bait a wobbling movement as well. Thus the subject of the present invention, in addition to constituting a spinning system, etc., can be also used as a wobbling system.

The manner in which the fish bait is attached to the lure is also indicated in FIG. 14. The lure body 101 is pushed into the fish and is attached to the stiff front part of the fish by a transverse headless threaded bolt 114 which is fixed at opposite ends by screws 115. The screws 115 also carry turbine-like flaps 118.

Figure 16:
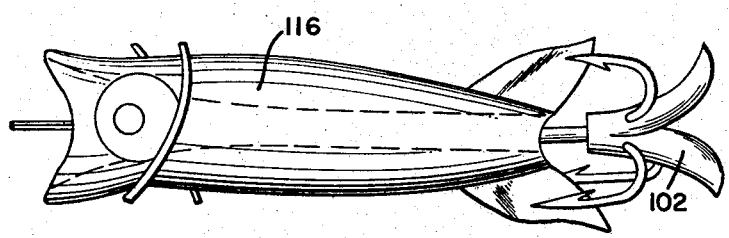
FIG. 16 is a side view of a different embodiment.

FIG. 16 shows the application of the present invention to an artificial fish bait body 116 which can be made of wood or a plastic material. The body 116 is formed by any known procedure, such as spraying, gluing, vulcanizing, etc. The attachment of the lure body and of the turbine-like flaps can be also conveniently carried out by threaded bolts and screws.

Figure 17:
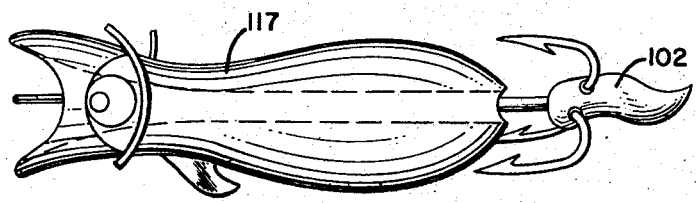
FIG. 17 is a side view of yet another embodiment.

Finally, FIG. 17 shows the application of the present invention for producing a mouse-like lure 117 formed by any suitable means. As shown by broken lines in FIG. 17, the lure 117 has a central passage extending therethrough. Through this passage extends a hook and line connection in a manner similar to that of earlier discussed constructions. Thus the fisherman is now provided, for the first time, with the possibility of pulling the lure through the water with a quite rotary movement, whereby the lure can be easily controlled even at slow speed.

It is apparent that the examples described above have been given solely by way of illustration and not by way of limitation and that they are capable of many variations and modifications within the scope of the present invention. All such variations and modifications are to be included within the scope of the present invention.

What is claimed is:

1. A fishing lure, comprising a lure body having the shape of a hollow conical funnel of substantially the same wall thickness with a wide front opening and a substantially narrower rear opening, line-holding means located within said lure body at the central axis and adjacent the center of gravity, thereof, a hook, means attaching said hook to said lure body, and fins connected to said lure body.

2. A fishing lure, comprising a lure body having the shape of a hollow conical funnel of substantially the same wall thickness with a wide front opening and substantially narrower rear opening, line-holding means located within said lure body at the central axis thereof, a hook, means attaching said hook to said lure body, and fins connected to said lure body, the ratio of the area of said front opening to the area of said rear opening being at least 30:1.

3. A fishing lure in accordance with claim 2, wherein said lure body has a front portion having the shape of a trumpet, said lure further having blade-like flow producing members connected to said lure body.

4. A fishing lure in accordance with claim 3, wherein said members are connected to an outer surface of said lure body.

5. A fishing lure in accordance with claim 3, wherein said members are located within said lure body.

References Cited

UNITED STATES PATENTS

| | | | |
|---|---|---|---|
| 2,008,437 | 7/1935 | De Witt | 43—42.36 X |
| 2,196,508 | 4/1940 | Steinhoff | 43—42.36 |
| 2,229,239 | 1/1941 | Davis | 43—42.06 |
| 2,494,407 | 1/1950 | Rhodes | 43—42.36 X |
| 2,845,743 | 8/1958 | Boyd | 43—42.36 X |
| 3,071,884 | 1/1963 | Peltz | 43—42.06 X |

ALDRICH F. MEDBERY, Primary Examiner

J. H. CZERWONKY, Assistant Examiner

U.S. Cl. X.R.

43—42.08, 42.46